United States Patent [19]
Koch et al.

[11] Patent Number: 5,624,160
[45] Date of Patent: Apr. 29, 1997

[54] AIRCRAFT DIVAN

[76] Inventors: Roger Koch, 311 NE. 103rd St., Miami Shores, Fla. 33138; Michael L. Oleson, 1721 NE. 17th Ave., Fort Lauderdale, Fla. 33305

[21] Appl. No.: 304,799

[22] Filed: Sep. 12, 1994

[51] Int. Cl.$^6$ ............... A47C 5/04; A47C 7/02
[52] U.S. Cl. ............ 297/452.2; 297/440.16; 52/655.1
[58] Field of Search ............ 297/452.48, 452.2, 297/440.16, 440.1, 452.55; 52/665.1, 656.9, 280; 403/280, 363, 231, 403

[56] References Cited

U.S. PATENT DOCUMENTS

| | | | |
|---|---|---|---|
| 947,655 | 1/1910 | Sullivan | 52/280 |
| 4,125,973 | 11/1978 | Lendrihas | 52/655.1 |
| 4,456,299 | 6/1984 | Steinmetz | 297/440.1 |
| 4,563,040 | 1/1986 | Alster | 297/440.1 |
| 4,697,847 | 10/1987 | Herschlag | 297/440.1 |
| 5,499,883 | 3/1996 | Heinzel | 297/440.1 |

FOREIGN PATENT DOCUMENTS 2429350  1/1980  France ............... 52/656.9

Primary Examiner—Peter M. Cuomo
Assistant Examiner—Anthony D. Barfield
Attorney, Agent, or Firm—Malloy & Malloy, P.A.

[57] ABSTRACT

An aircraft divan which includes a strong, rigid base structure having a plurality of substantially strong, yet lightweight tubular frame members secured, so as to define the base structure, by a plurality of substantially strong, yet lightweight connectors, each of the connectors having an exterior wall structure which defines at least one interior cavity and at least two tube receiving openings wherethrough the tubular frame members pass into securing disposition within the interior cavity of the connector. Secured in spanning relation between select ones of the tubular frame members is at least one panel member which defines at least one exterior face of the base structure whereon padding is disposed, the padding and base structure being substantially covered by external upholstery.

12 Claims, 3 Drawing Sheets

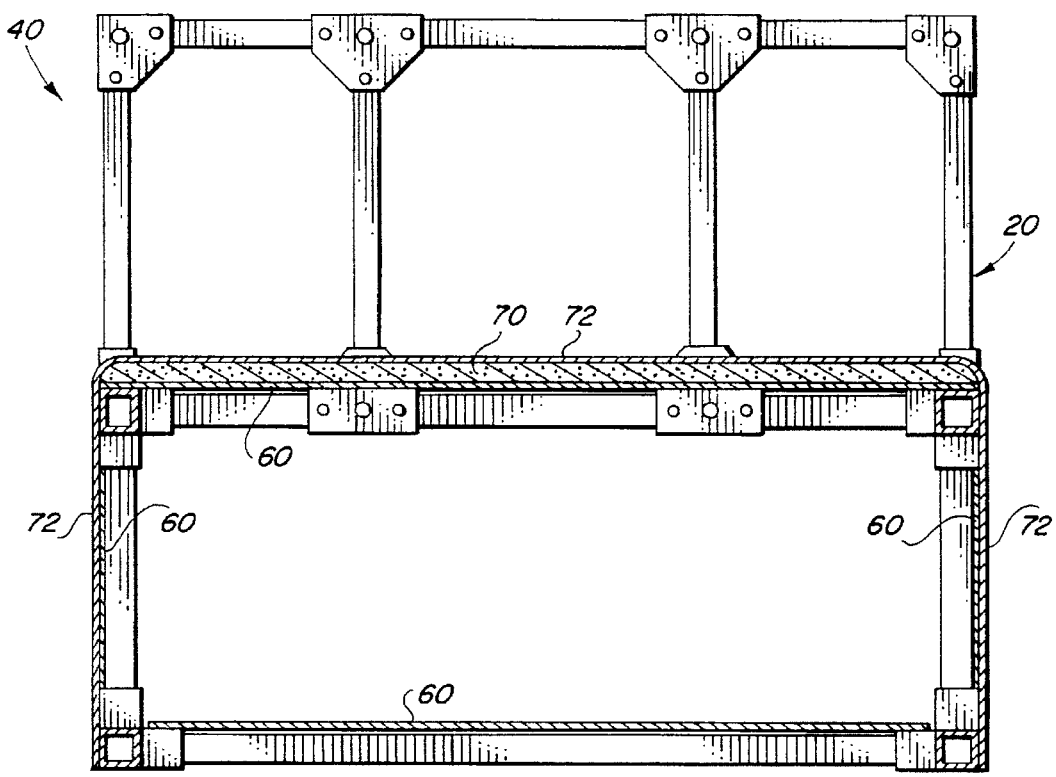
FIG. 3
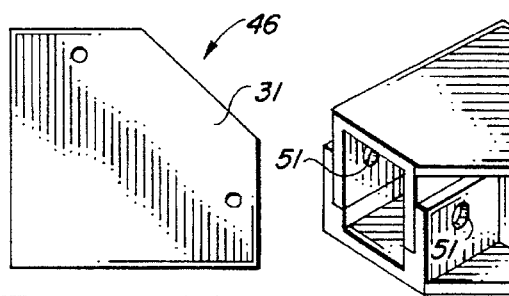
FIG. 4C3
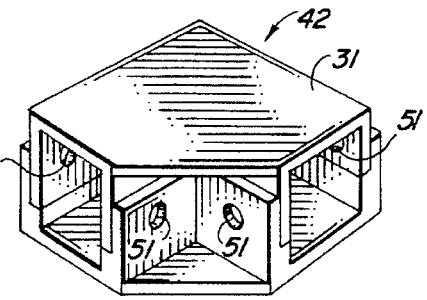
FIG. 4A
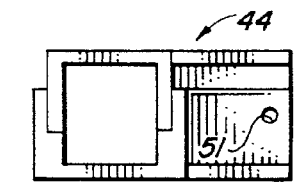
FIG. 4B3
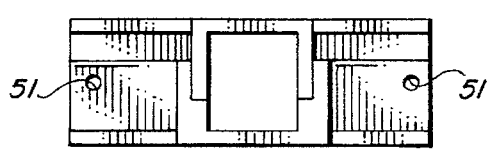
FIG. 4B1
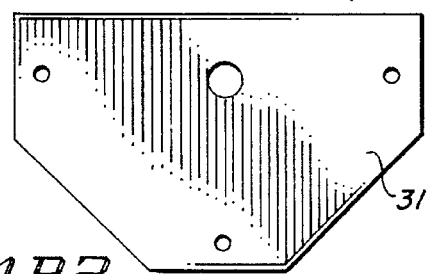
FIG. 4B2

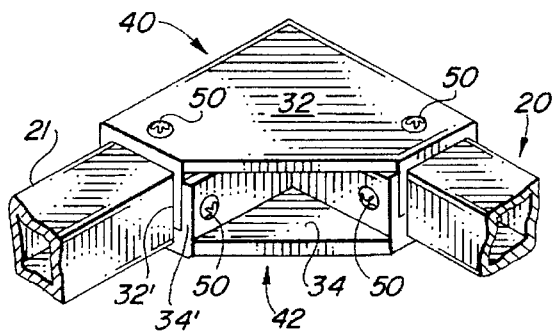
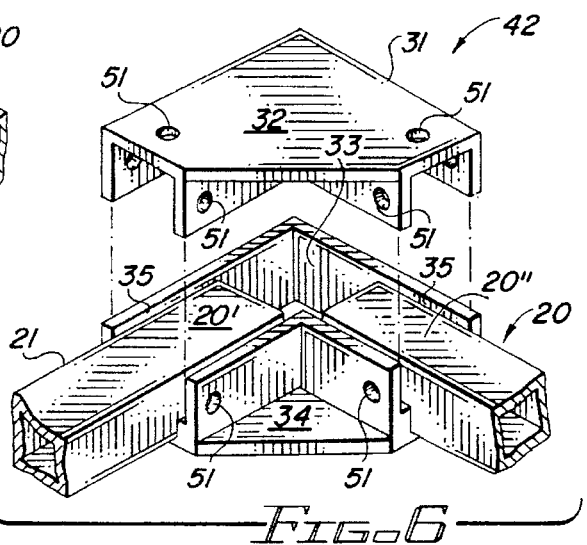
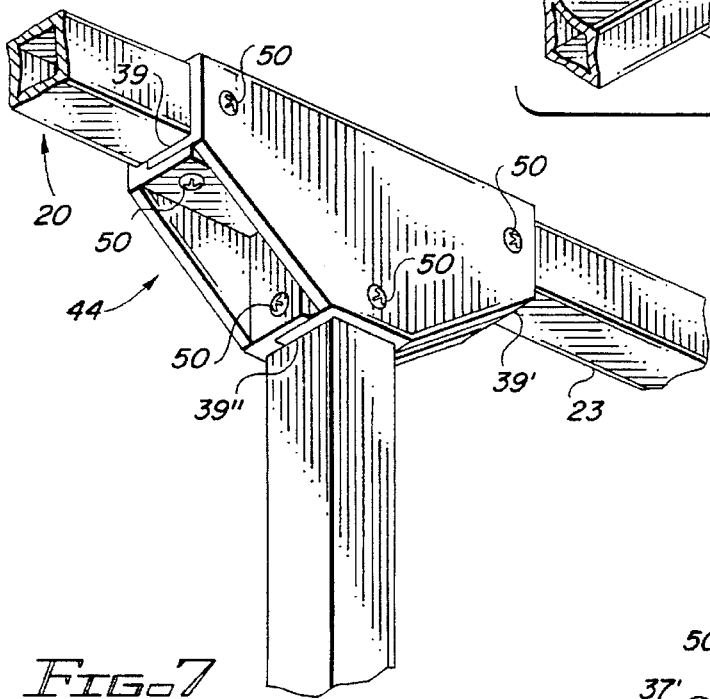
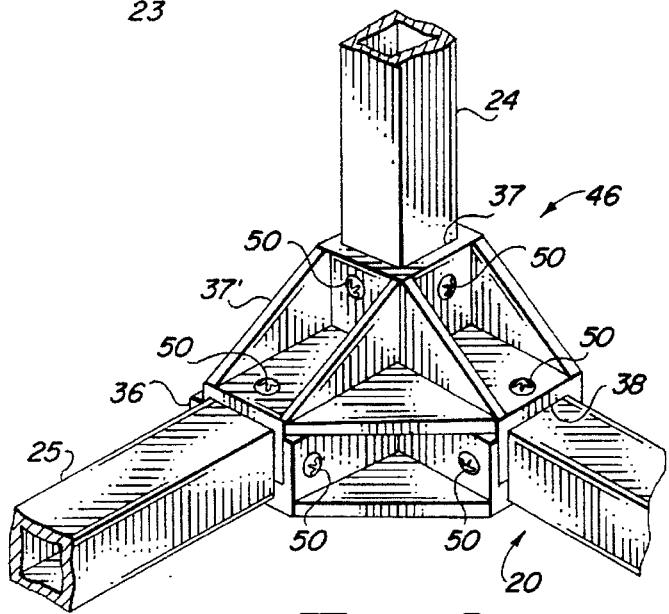

AIRCRAFT DIVAN

BACKGROUND OF THE INVENTION

1. Field of the Invention

The present invention relates to an aircraft divan to be utilized within a passenger compartment of an aircraft so as to provide a comfortable, strong, yet substantially lightweight seating assembly for passengers within the aircraft.

2. Description of the Related Art

Many private as well as commercial aircraft, due to the desire to provide a substantially elegant and comfortable appearance and due to their manner of use, deviate substantially in their interior accommodation from what is generally encountered in most commercial, mass transit aircraft. In order to provide a comfortable "lounging" environment or multi-passenger seat assemblies, specially constructed divans (sitting or lounging assemblies in the form of chairs and sofas) are utilized. These divans must be constructed to strict specifications, due to the substantial guidelines set forth by aviation regulation committees such as the Federal Aviation Administration (FAA), such that the use of conventional furnishings secured within the aircraft will not suffice.

In particular, the FAA places significant structural requirements on all interior aircraft furnishings, the structural requirements generally relating to the amount of load they can support and more importantly, to their crash resistance or "crash worthiness." As such, these furnishings, such as divans, can generally not be framed of wood, but rather must be made of a strong, rigid metal.

Presently, high strength steel tubing is utilized to construct divan frames. Steel tubing is the preferred metal material because of its high strength, and further, meets the FAA requirements when formed into a framing structure. More importantly, steel tubing can be welded to construct a strong divan frame whereas other materials cannot be welded. However, there are substantial drawbacks involved with using the steel tubing which necessitate an improved method of constructing an aircraft divan. Specifically, one drawback is the requirement that all welded tubing segments be formed of a like metal in order to insure appropriate securing. Another drawback is that the welding of materials is both time consuming and requires special skills and training in order to be performed. Yet another and highly important drawback to welded steel structures, involves the substantial weight associated with the use of steel tubing or other weldable materials of sufficient strength. Because weight is such an important consideration in the flight time and fuel consumption of an aircraft, the incorporation of sizeable furnishings utilizing the steel tubing can seriously diminish the fuel economy of the aircraft. Therefore, heavy, welded steel frame divans are not only an appreciable cost to the consumer when purchased and installed, but also will provide a significant added cost to the operation of the aircraft containing those furnishings.

Accordingly, there is a substantial need in the art for an aircraft divan which can be constructed in such a manner so as to meet the structural requirements for use in an aircraft, while minimizing the additional weight which must be carried by an aircraft utilizing the furnishings. The structure of the present invention is constructed specifically to meet the needs by utilizing strong, yet lightweight, weldable or non-weldable tubing to form a strong rigid frame as required for aircraft furnishings.

SUMMARY OF THE INVENTION

The present invention is directed to an aircraft divan to be utilized on an aircraft in order to allow passengers on the aircraft to sit comfortably within the passenger compartment. The divan includes primarily a strong rigid base structure which will be positioned and secured within the passenger compartment of the aircraft. The base structure includes a number of substantially strong, yet lightweight tubular frame members and a plurality of substantially strong, yet lightweight connectors. The connectors are structured and disposed to connectingly receive adjacently disposed tubular frame members in order to secure the tubular frame members to one another and define the strong, rigid base structure.

Included as part of each of the connectors is an exterior wall structure which defines at least one interior cavity and at least two tube receiving openings. In particular, the tube receiving openings are structured and disposed so as to receive a tubular frame member therethrough into securing disposition within the interior cavity of the connector utilizing a plurality of the tubular segments secured together by the connector, the base structure is defined. Further, fastening means are utilized with each connector to secure the tubular frame members within the interior cavity of the connectors, and ensure that the strong, rigid base structure is maintained.

Secured in spanning relation between select ones of the tubular frame members is at least one panel member. The panel member is positioned so as to define at least one exterior face of the base structure whereon padding is disposed. Finally, the base structure is substantially covered by external upholstery giving the aircraft divan an attractive, fashionable appearance.

It is an object of the present invention to provide an aircraft divan which is substantially strong and rigid so as to meet the FAA strength and crash worthiness requirements for interior furnishings of an aircraft.

Still another object of the present invention is to provide a strong aircraft divan which is substantially lightweight relative to existing divans, cutting the weight of the divan almost in half and thereby substantially minimizing the weight which must be transported by the aircraft.

A further object of the present invention is to provide an aircraft divan which will substantially increase the fuel economy of an aircraft by reducing the overall weight which must be carried by the aircraft.

Yet another object of the present invention is to provide an aircraft divan which is substantially strong, yet lightweight and which will be substantially easy and cost effective to construct.

An additional object of the present invention is to provide aircraft divan which is substantially strong yet lightweight and is capable of being quickly and easily constructed in a variety of sizes and designs.

BRIEF DESCRIPTION OF THE DRAWINGS

For a fuller understanding of the nature of the present invention, reference should be had to the following detailed description taken in connection with the accompanying drawings in which:

FIG. 3 is a cross-sectional view of the invention taken along line 3—3 of FIG. 1.

FIG. 4-A is an isolated view of a two-way corner connector.

FIG. 4-B illustrates isolated views of a three way support connector.

FIG. 4-C illustrates isolated views of a three way corner connector.

FIG. 5 is a perspective view of a two-way corner connector with the end zones of two tubular frame members secured therein.

FIG. 6 is an exploded view of the connector shown in FIG. 5 and clearly illustrating a preferred form of a connector having first and second interlocking segments.

FIG. 7 is a perspective view of a three way support connector with the end zones of three tubular frame members secured therein.

FIG. 8 is a perspective view of a three-way corner connector with the end zones of three tubular frame members secured therein.

DETAILED DESCRIPTION OF THE PREFERRED EMBODIMENT

Figure 1:
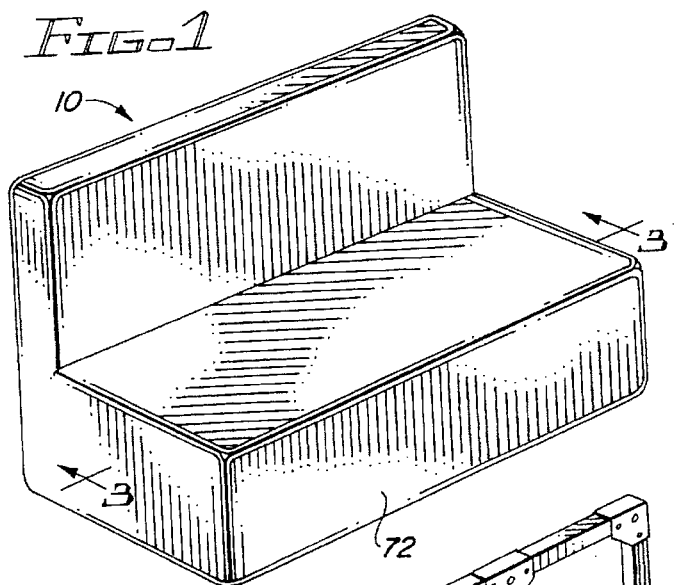
FIG. 1 is a perspective view of the aircraft divan of the present invention.

As shown throughout the figures, the present invention is directed towards an aircraft divan, generally indicated as 10. The aircraft divan will preferably be constructed in a sofa-type configuration, as illustrated in FIG. 1, although it may be constructed in a chair or bench-type configuration, and is structured to be securely fastened within the passenger compartment of an aircraft, thereby providing strong, comfortable seating for passengers within the aircraft.

Specifically, the aircraft divan includes a strong, rigid, base structure which will be secured to the aircraft itself, preferably to a support surface such as a floor within the aircraft, and which base structure substantially defines the configuration of the divan. As illustrated in FIG. 1, this base structure is formed primarily from a plurality of substantially strong yet lightweight tubular frame members generally indicated at 20, and more specifically, 21 through 29. These tubular frame members, which can have a round, square, or any other geometric configuration, will preferably be formed of a hollow tubing and will most preferably be formed of a high strength aluminum alloy. The high strength aluminum alloy, which is generally not weldable and therefore, cannot be used in conventional divan structures, is sized and structured into substantially lightweight tubes which have a strength sufficient to meet the FAA crash load testing requirements, and which are approximately half the weight of equivalent strength steel tubes.

Figure 2:
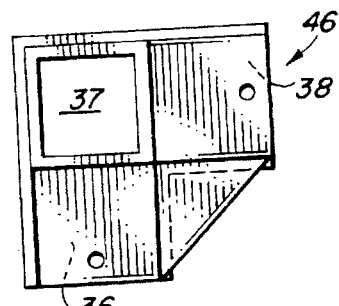
FIG. 2 is a perspective view of the base structure of the aircraft divan of the present invention.
Figure 2:
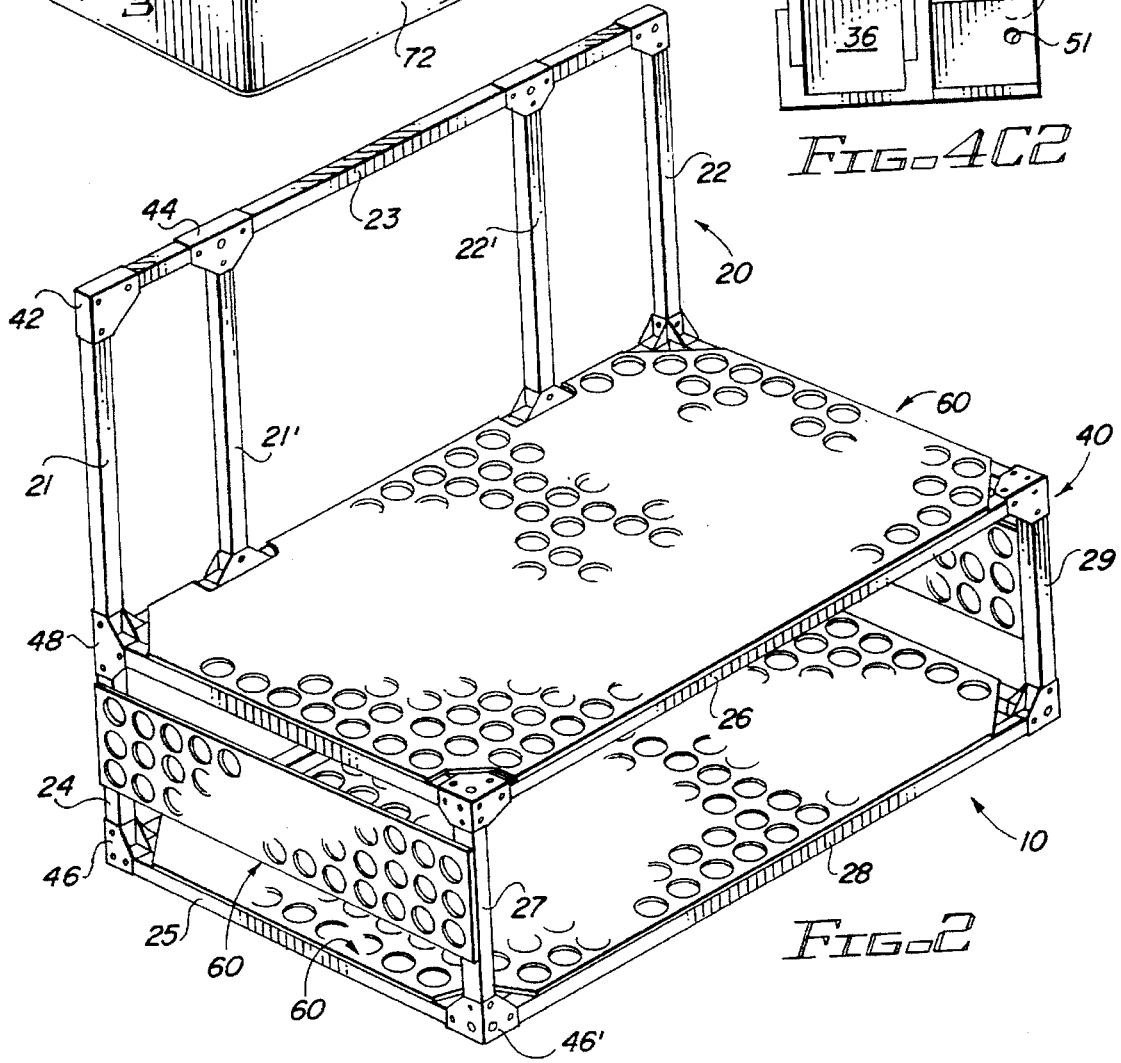

Referring now to FIG. 2, the invention is seen to include a plurality of substantially strong, yet lightweight connectors generally indicated at 40, and more particularly, 42, 44, 46 and 48, which are disposed to connect the various tubular frame members 20, to one another. These connectors, which preferably will also be formed of a high strength aluminum alloy, can be formed of any strong, durable material, as they will not be welded to the tubular frame members, 20 and therefore do not need to be of a like material. The connectors 40 are structured to secure the tubular frame members to one another in such a manner as to define the strong rigid base structure, each connector connectingly receiving at least two adjacently disposed tubular frame members 20. Referring now to FIGS. 2, 4A–C and 5–8, defining the structure of each of the connectors is an exterior wall structure 31. This exterior wall structure 31 will preferably define at least one interior cavity 33 and at least two tube receiving openings 35 of the connector, perhaps best illustrated in FIG. 6. It will be appreciated that each of tube receiving openings 35 of connectors 40 are structured and disposed to connectingly receive and axially surround an end zone 20' or 20' of one of the tubular frame members therethrough 20, such that the end zones of adjacently disposed tubular frame members 20 can pass through the tube receiving opening 35 and into the interior cavity 33, where the end zone of the tubular frame member can be maintained in a secured, fixed position within the interior cavity 33 of the connector 40. The two tube receiving opening connector shown in FIG. 5, will define a two-way corner connector 42, such as will be used on the seat back portion of the divan, as illustrated in FIG. 2.

Additionally, two interior cavities may be defined within the connector, each tube receiving opening 35 accessing a particular interior cavity wherein an end zone of the tubular frame members 20 will be secured.

A majority of the connectors, however, must be three way connectors, 44 and 46 which are best illustrated in FIGS. 2, 7 and 8. In such a case, there will be three tube receiving openings 36, and at least two of these tube receiving openings, 37 and 38 will preferably be perpendicularly disposed relative to one another to help define a corner. When forming a rectangular or square type base structure, it will be appreciated from FIGS. 2 and 8 that the third tube receiving opening of the three way connector will also be perpendicularly disposed relative to the other two tube receiving openings, therefore extending into three perpendicular planes for receiving tubular frame segments. Further, in such a connector, either one, two or three interior cavities may be defined within the connector.

Similarly, a three way support connector 44 can be included for use with various support segments throughout the base structure. In particular and as best shown in FIG. 7, two of the tube receiving openings 39 and 39' of the three way support connector 44 can be in line with one another to either connect two adjacent tubular frame members in line with one another or to be disposed about a mid portion of a single tubular frame member. In this case, the third tube receiving opening 39" of the connector can extend in a direction perpendicular from the other two tube receiving openings or can be angled in any of a variety of configurations to provide additional support or cross braces utilizing the tubular frame members.

The various connectors 40 of the present invention can be formed of a single molded piece wherein the tubular frame members will slide into the interior cavity of the connector through one of the tube receiving openings, such as shown in FIG. 2, or can be formed of a number of interlocking segments, such as illustrated in FIGS. 4A–C and FIGS. 5–8. In the preferred embodiment, each connector will include at least two interlocking segments, namely a first interlocking segment 32 and a second interlocking segment 34. These first and second interlocking segments are adapted to be fitted within one another so as to interlock in sandwiching relation about an end zone of a tubular frame member 20. In particular, and as best shown in FIG. 5, there can be a male segment 32' formed on first interlocking segment 32 and a female segment 34' formed on second interlocking segment 34, the male segment 32' being structured to be fitted within the female segment 34' so as to surround and captivate an end zone of a tubular frame member therein and within the interior cavity defined upon the interlocking segments being connected with one another. In the case of a two way connector, 42 at least one but possibly two interior cavities within the connector are exposed when the interlocking segments are separated such that an end zone of adjacent tubular frame members can be laid in place within one of the interlocking segments until the other interlocking segment is secured thereon in sandwiching relation about the tubular frame members. Similarly, in the case of a three way support connector, 44 the interlocking segments will also preferably be two like halves, with one being male and one being female. Accordingly, the connector can more easily be fitted over a mid portion of one of the tubular frame members for facilitated construction, rather than requiring that the connector be slid over the length of the tubular frame member to its desired location. Finally, in the case of a three way, corner type connector, 46 one of the interlocking segments will preferably include an integrally formed extension portion 37' which defines a third of the tube receiving openings. As seen in FIG. 8, in such a case, an end zone of one of the tubular frame members 24 will be slid into the third tube receiving opening 37, of integrally, pre-formed extension portion 37' and the connector 46 can be positioned to sandwich the end zones of the other adjacent tubular frame members. Although this is the primary configuration for the individual connectors, it can be molded in any number of interlocking segments so as to ensure quick and easy fabrication of the base structure. It will also be appreciated from FIG. 2 that a four way connector 48, will also be utilized in the divan which can be formed in the same manner and of similar structure as connectors 42, 44 and 46.

Once the tubular frame members 20 are secured within the various connectors 40 so as to define the base structure, the tubular frame members are fixedly maintained in position by fastening means. As illustrated in FIGS. 5, 6 and 7, these fastening means 50 can take the form of rivets, screws, bolts, straps, or any other suitable fastener which will firmly and securely hold the tubular frame members in place within the connectors. Further, each of the connectors 42, 44, 46 and 48 and tubular frame members 20 will preferably include pre-formed openings 51 formed therein to more easily define the positioning of said fastening means and facilitate passage of the fastening means therethrough, although the openings 51 can equivalently be formed upon fabrication of the base structure, or can be eliminated altogether if using a strap or clamp-type fastening means to secure the tubular frame members 20 within the various connectors 40.

Secured in spanning relation between select ones of the tubular frame segments are at least one but preferably a number of panel members, generally indicated at 60. The panel members define exterior faces of the divan and are preferably thin, lightweight metal panels 60 which are secured to the tubular frame members 20 by fastening means such as those utilized to secure the tubular frame members 20 within the connectors 40. Although the panel members can be formed of any substantially strong, weight supporting material, and in fact can be formed of wood or a variety of strong fabrics or meshes, they will preferably be formed of aluminum sheets. Additionally, these aluminum sheets can include a number of cutouts along the surface thereof to minimize the overall surface area of the panel and thereby reduce the overall weight of the panels without minimizing its supporting strength. The panel members 60 will be disposed so as to define a seat of the base structure, one or a number of panels being usable to define the seat, but depending upon the use of the divan and the requirements of its construction and its weight limitation, all exterior faces of the base structure can be defined by one or a plurality of panel members.

Finally, disposed atop the exterior faces, as preferably defined by the panel members, 70 is padding. The padding, 70 which is provided to add comfort to the divan, need not be included in a bench-type configuration of the divan, but preferably will be included for added comfort. Additionally, in order to give the divan its attractive exterior appearance, when needed, external upholstery 72 will be utilized to substantially cover any padding 70 and the base structure.

The aircraft divan is structured such that it can be formed in any of a variety of shapes and configurations to meet the needs of a particular aircraft passenger compartment. Further, the connectors 40 of the present invention can also be easily adapted to include extensions by which the aircraft divan can be mounted to other furnishings within the passenger compartment or directly to the aircraft itself in order to provide secure, stable positioning of the divan within the aircraft.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An aircraft divan for use within a passenger compartment of an aircraft, comprising:
   (a) a strong rigid base structure adapted to be secured to a support surface within the aircraft,
       said base structure including a plurality of substantially strong, yet lightweight tubular frame members,
   (b) a plurality of substantially strong, yet lightweight connectors,
       each one of said plurality of connectors being structured and disposed to connectingly receive at least two of said tubular frame members,
       each of said connectors including an exterior wall structure defining at least one interior cavity and at least two tube receiving openings,
       each of said connectors comprising a first interlocking segment and a second interlocking segment, said first interlocking segment structured to at least partially receive said second interlocking segment and said first and second interlocking segments being structured to be interlockingly connected with one another in sandwiching relation about at least one end zone of said tubular frame members;
       each of said tube receiving openings being structured and disposed to receive and surround one of said end zones of one of said tubular frame members therethrough and to maintain said end zone of said tubular member in a secured, fixed position within said interior cavity of said connector, and
   (c) fastening means structured to securely maintain said tubular frame members within said connectors so as to define said strong, rigid base structure.

2. An aircraft divan as recited in claim 1, further comprising at least one panel member spanning select ones of said tubular frame members so as to define at least one exterior face of said base structure.

3. An aircraft divan as recited in claim 1, wherein said tubular frame members are formed of a high strength aluminum alloy.

4. An aircraft divan as recited in claim 1, wherein said connectors are formed of a high strength aluminum alloy.

5. An aircraft divan as recited in claim 1, wherein said exterior wall structure of at least one of said connectors defines at least three tube receiving openings.

6. An aircraft divan as recited in claim 5, wherein at least two of said at least three tube receiving openings are disposed in perpendicular relation to one another so as to define a corner of said base structure.

7. An aircraft divan as recited in claim 1, wherein said fastening means includes rivets.

8. An aircraft divan as recited in claim 1, wherein said fastening means includes screws.

9. An aircraft divan as recited in claim 1, wherein said fastening means includes bolts.

10. An aircraft divan as recited in claim 1 further comprising padding disposed on said exterior face.

11. An aircraft divan as recited in claim 10 further comprising external upholstery substantially covering said padding and said base structure.

12. An aircraft divan, comprising:

(a) a strong rigid base structure, said base structure including a plurality of substantially strong, yet lightweight tubular frame members, said tubular frame members being formed of a high strength aluminum alloy, (b) a plurality of substantially strong, yet lightweight connectors structured and disposed to connectingly receive adjacently disused tubular frame members so as to define said strong, rigid base structure, each of said connectors being formed of a high strength aluminum alloy, each of said connectors including an exterior wall structure defining at least one interior cavity and at least two tube receiving openings, each of said tube receiving openings being structured and disposed to receive one of said tubular frame members therethrough into securing position within said interior cavity of said connector, each of said connectors including a first interlocking segment and a second interlocking segment, said first interlocking segment and said second interlocking segment being structured to be interlockingly connected with one another in sandwiching relation about said tubular frame members, said first interlocking segment being structured to at least partially receive said second interlocking segment therein, (c) fastening means structured to maintain said connectors securely on said tubular frame members, (d) at least one panel member spanning select ones of said tubular frame members so as to define at least one exterior face of said base structure, (e) padding disposed on said exterior face, and (f) external upholstery substantially covering said padding and said base structure.

* * * * *